US012589408B2

(12) United States Patent
Gozzi et al.

(10) Patent No.: US 12,589,408 B2
(45) Date of Patent: Mar. 31, 2026

(54) DISPENSING DEVICE FOR DECORATING CERAMIC TILES WITH GRANULAR OR POWDERED MATERIALS

(71) Applicant: SYSTEM CERAMICS S.P.A., Fiorano Modenese (IT)

(72) Inventors: Franco Gozzi, Formigine (IT); Ivan Ghirelli, Castellarano (IT); Paolo Vaccari, Modena (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 387 days.

(21) Appl. No.: 18/245,478

(22) PCT Filed: Nov. 3, 2021

(86) PCT No.: PCT/IB2021/060154

§ 371 (c)(1),
(2) Date: Mar. 15, 2023

(87) PCT Pub. No.: WO2022/097027

PCT Pub. Date: May 12, 2022

(65) Prior Publication Data

US 2023/0356261 A1 Nov. 9, 2023

(30) Foreign Application Priority Data

Nov. 6, 2020 (IT) ........................ 102020000026542

(51) Int. Cl.
*B05C 19/04* (2006.01)
*B05C 19/06* (2006.01)
(Continued)

(52) U.S. Cl.
CPC .............. *B05C 19/04* (2013.01); *B05C 19/06* (2013.01); *B28B 11/001* (2013.01); *B28B 11/047* (2013.01)

(58) Field of Classification Search
None
See application file for complete search history.

(56) References Cited

U.S. PATENT DOCUMENTS 4,573,504 A 3/1986 Rosenstroem
4,974,646 A * 12/1990 Martin ...................... B65B 1/16 141/46

(Continued)

FOREIGN PATENT DOCUMENTS

EP 0125585 11/1984
EP 0224621 6/1987

(Continued)

OTHER PUBLICATIONS

International Search Report and Written Opinion, issued Jan. 24, 2022.

*Primary Examiner* — Binu Thomas
(74) *Attorney, Agent, or Firm* — Chrisman Gallo Tochtrop LLC

(57) ABSTRACT

A dispensing device for decorating ceramic tiles with granular or powdered materials that includes a main body and a dispensing channel arranged in the main body and provided with a longitudinal axis. The channel has an inlet and an outlet opening along with a suction means, provided to retain a part of granular or powdered material inside the dispensing channel to form an accumulation that obstructs the dispensing channel and prevents the flow of material. A suction opening is arranged in communication with the dispensing channel and with the suction means and has a filter, interposed between the suction opening and the dispensing channel. A ventilation portion, associated with the main body and connected to the inlet opening of the dispensing device has an outer surface that communicates with the environment as a determined pressure.

18 Claims, 4 Drawing Sheets

(51) Int. Cl.
*B28B 11/00* (2006.01)
*B28B 11/04* (2006.01)

(56) References Cited

U.S. PATENT DOCUMENTS

| | | | | |
|---|---|---|---|---|
| 5,598,876 | A * | 2/1997 | Zanini | B65B 1/16<br>141/93 |
| 6,102,088 | A * | 8/2000 | Wegman | B65B 1/12<br>141/47 |
| 6,340,036 | B1 * | 1/2002 | Toyoizumi | B65B 1/12<br>141/67 |
| 2007/0131707 | A1 * | 6/2007 | Poole | B65B 1/12<br>222/14 |
| 2022/0111413 | A1 | 4/2022 | Ghirelli | |

FOREIGN PATENT DOCUMENTS

| | | |
|---|---|---|
| EP | 0318247 | 6/1992 |
| WO | 2020/183353 | 9/2020 |

* cited by examiner

DISPENSING DEVICE FOR DECORATING CERAMIC TILES WITH GRANULAR OR POWDERED MATERIALS

The present invention relates to a dispensing device for materials in powder or granule form. The present invention also relates to a dispensing bar for materials in powder or granule form.

In particular, the invention relates to a dispensing device which allows the controlled deposit of a granular or powdered material.

The invention is useful for the decoration of ceramic tiles.

As is known, the decoration of ceramic tiles substantially occurs with two main techniques.

A first technique involves applying the decoration on the raw tile by means of ink jet printers. The decoration is applied on the tile after pressing and before firing.

A second technique involves applying the decoration, always in a step prior to firing the tile, in the form of granular or powdered material.

In this second technique, the granular or powdered material which forms the decoration is deposited by means of devices of varying nature.

Some of the devices currently used involve the deposit of the material by gravity, through unloading openings provided with a closure means which can be operated in a controlled manner. The current devices, even those of a more complex type, do not however allow the amount or the position of the material deposited to be controlled precisely. The current devices, in substance, are only useful for realising decorations in the form of relatively imprecise shading or veining.

Recently, the applicant has designed and developed a dispensing device for granular and/or powdered materials which overcomes the technological limits summarised above.

Such device, described in publication WO2020/183353, comprises a dispensing channel, provided with an inlet opening for the material to be dispensed and an outlet opening, through which the material can be dispensed downwards. The dispensing device comprises a suction means, provided to retain, upon command, at least a part of granular or powdered material inside the dispensing channel, so as to form an accumulation that obstructs the dispensing channel and prevents the flow of material. Dispensing control substantially takes place through the control of the suction means. In particular, the activation of the suction means blocks the dispensing of the material, whereas the deactivation of the suction means, possibly accompanied by an auxiliary jet of air to fluidise the material, produces the dispensing of the material.

By actuating a control for very quick activation/deactivation time cycles, i.e. by using very quick activation/deactivation frequencies for the suction means, it is possible to dispense very small quantities of material very close to one another in succession. Thanks to this type of control, made possible by the structure of the dispensing device, it is possible to obtain very similar dispensing of material in terms of precision and dimension of the dispensed mass, to the dispensing of liquid obtainable with an ink jet printer.

Various dispensing devices of the type described above can be arranged adjacent to one another along an alignment direction, with the outlet openings flanked to one another and facing in the same direction, so as to form a deposition bar. Such deposition bar has a deposition front, substantially defined by the total area of the outlet openings of the various dispensing devices, which has a certain length. A support can be made to transit below the deposition bar, to receive the material dispensed by the various dispensing devices, like what happens in ink jet printers. The precise control of the individual dispensing devices enables well defined decorations to be realised with a predefined conformation.

The dispensing device and the bar described above produce very defined and precise decorations, with a decisively superior quality with respect to those obtainable with previously used devices.

The applicant has found that, under certain use conditions, it is possible to further improve the performance of the bar.

In particular, it can happen that dispensing devices which are adjacent in the bar interfere with one another fluid-dynamically, altering the effect produced by the suction activation/deactivation cycles. In other words, the suction/release effect produced by each suction means is also partially propagated to the adjacent dispensing devices. This can imply an alteration both to the quantity of material effectively dispensed and to the time at which the material is dispensed.

The aim of the present invention is that of improving the performance of the dispensing device and dispensing bar currently available.

Features and advantages of the present invention will more fully emerge from the following detailed description of an embodiment of the present invention, as illustrated in a non-limiting example in the accompanying figures, in which.

Figure 1:
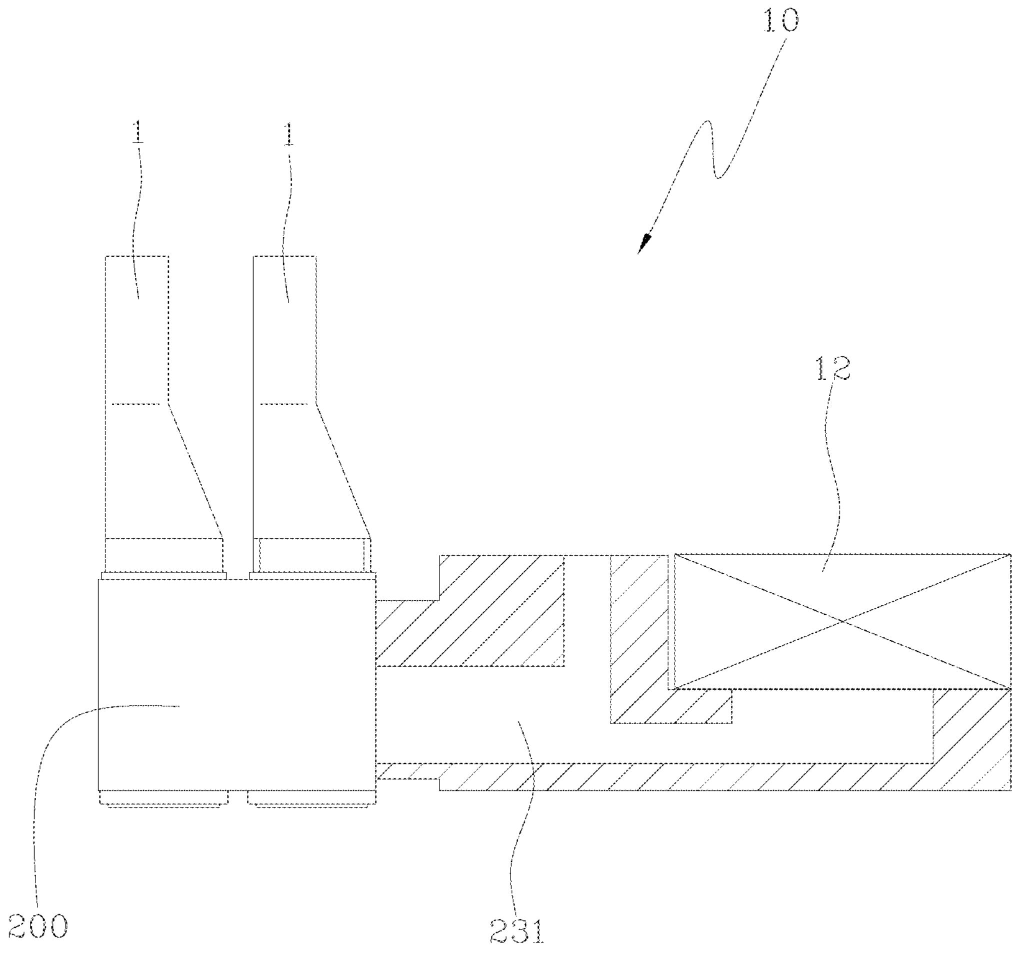
FIG. 1 shows a vertical elevation side view of a dispensing bar comprising a plurality of dispensing devices according to the present invention, in a partial section.

The dispensing device according to the present invention lends itself particularly well to the controlled dispensing of a loose material, in granular or powdered form. An example of a material which can advantageously be dispensed through the device according to the present invention is atomised ceramic. In the following description, the incoherent material will be generically indicated as "product".

The dispensing device according to the present invention comprises a main body (200). A dispensing channel (2*a*), provided with a longitudinal axis (X), is arranged in the main body (200).

The dispensing channel has an inlet opening (21), for feeding the product, and an outlet opening (22) for dispensing the product.

Preferably, but not necessarily, the dispensing channel (2*a*) has an inlet portion with a circular cross section in a plane perpendicular to the longitudinal axis (X), and an outlet section with an oval or ellipsoidal cross section. The dispensing channel (2*a*) could however have a different shape, for example it could have a prismatic shape, or it could have a quadrangular or polygonal contour on a section plane perpendicular to the longitudinal axis (X).

Preferably the dispensing channel (2*a*) is arranged so that the longitudinal axis has an inclination such as to allow the product to flow by gravity from the inlet opening (21) to the outlet opening (22). For example, the dispensing channel (2*a*) is arranged with the longitudinal axis (X) oriented vertically.

The inlet opening (21) can be connected to a tank or other device for feeding the product. Preferably, but not necessarily, the inlet opening (21) is circular shaped, i.e. it has a circular contour.

In the embodiment shown, the outlet opening (22) has an oval contour on a section plane perpendicular to the longitudinal axis (X). In other words, the outlet opening (22) has an elongated shape along a transverse axis (Y), substantially horizontal and perpendicular to the longitudinal axis (X). Moreover, the outlet opening (22) is positioned at the end of an outlet section (22*a*) of the dispensing channel (2*a*) which has a flattened conformation on a plane containing the longitudinal axis (X) and the transverse axis (Y). Other shapes for both the outlet opening (22) and the outlet section (22*a*) would however be possible, for example a cylindrical or truncated-conical shape. The embodiment shown in the figures offers the advantage of allowing the flanked arrangement of multiple outlet openings (22) along the longitudinal axis (X) and the transverse axis (Y) in a particularly compact configuration.

The dispensing device according to the present invention comprises a suction means arranged to retain, on command, at least a part of the product inside the dispensing channel (2*a*), so as to form an accumulation which obstructs the dispensing channel (2*a*) and prevents the flow of the product. In substance, the suction means is structured to cause an accumulation or stagnation of product which, by increasing the sliding friction between the particles which form the product, causes the clogging and obstruction of the dispensing channel (2*a*).

The suction means according to the present invention offers the important advantage of not compressing or crushing the product. In fact, the product becomes clogged inside the dispensing channel (2*a*) substantially by means of mutual friction between the particles. This is very advantageous for example in the case in which the product is an atomised ceramic which, as known, is composed of hollow spherical particles. The advantage of not compressing or squeezing the product is also significant in the presence of an especially abrasive product.

In the illustrated embodiment, the suction means is placed in communication with the dispensing channel (2*a*). The suction means, on command, attracts and retains at least a part of product inside the dispensing channel (2*a*). For example, the suction means retains at least a part of product in contact with or near at least one inner surface of the dispensing channel (2*a*), to form an accumulation which obstructs the dispensing channel (2*a*). As already underlined, the product retained in contact with the inner surface of the dispensing channel (2*a*) reduces the passage section of the latter and forms the accumulation or clogging which prevents the flow of the product. The deactivation of the suction means frees the product which can resume flowing along the dispensing channel (2*a*).

In substance, the suction means is arranged to produce a negative pressure which is placed in communication with the dispensing channel (2*a*). To this end, the suction means comprises for example a vacuum pump, or a circuit comprising a Venturi conduit placed in communication with the dispensing channel (2*a*). Other means and devices capable of producing a negative pressure are also suitable for the purpose.

In the embodiment illustrated, the dispensing device comprises one or more suction openings (23), placed in communication with the suction means and with the dispensing channel (2*a*). In other words, the suction openings (23) place the suction means in communication with the dispensing channel (2*a*). In the embodiment shown, the device comprises a suction opening (23), arranged through the main body (200). The suction opening (23) faces the dispensing channel (2*a*). In a possible embodiment, not shown, the dispensing device can be provided with a plurality of suction openings (23), in the form of micro-holes or holes of small diameter, facing the dispensing channel (2*a*).

The suction openings (23) present are connected to the suction means.

In a condition of product flow through the dispensing channel (2*a*), the activation of the suction means produces a suction effect of the product in the direction of the suction opening (23). The product is thus attracted and retained in contact with or near the inner surface of the dispensing channel (2*a*), forming the accumulation which obstructs the channel (2*a*) itself. The deactivation of the suction means frees the accumulation of product, allowing the restoration of the flow.

The values of negative pressure can vary from 100 mb to 400 mb.

Preferably, a filter (20) is interposed between each suction opening (23) and the dispensing channel (2*a*). Filter in general means an element provided with a perforated wall, which enables the passage of air but retains the particles or granules of product.

The filter (20) prevents the product from flowing through the suction opening (23). In the presence of the negative pressure or suction, i.e. in the condition of activation of the suction means, the product adheres to the filter (20). The filter (20) can be of various known structures. The structure of the filter must be chosen in relation to the characteristics of the product to be dispensed, i.e. the filter must be able to retain the particles or granules of the product to be dispensed.

Figure 4:
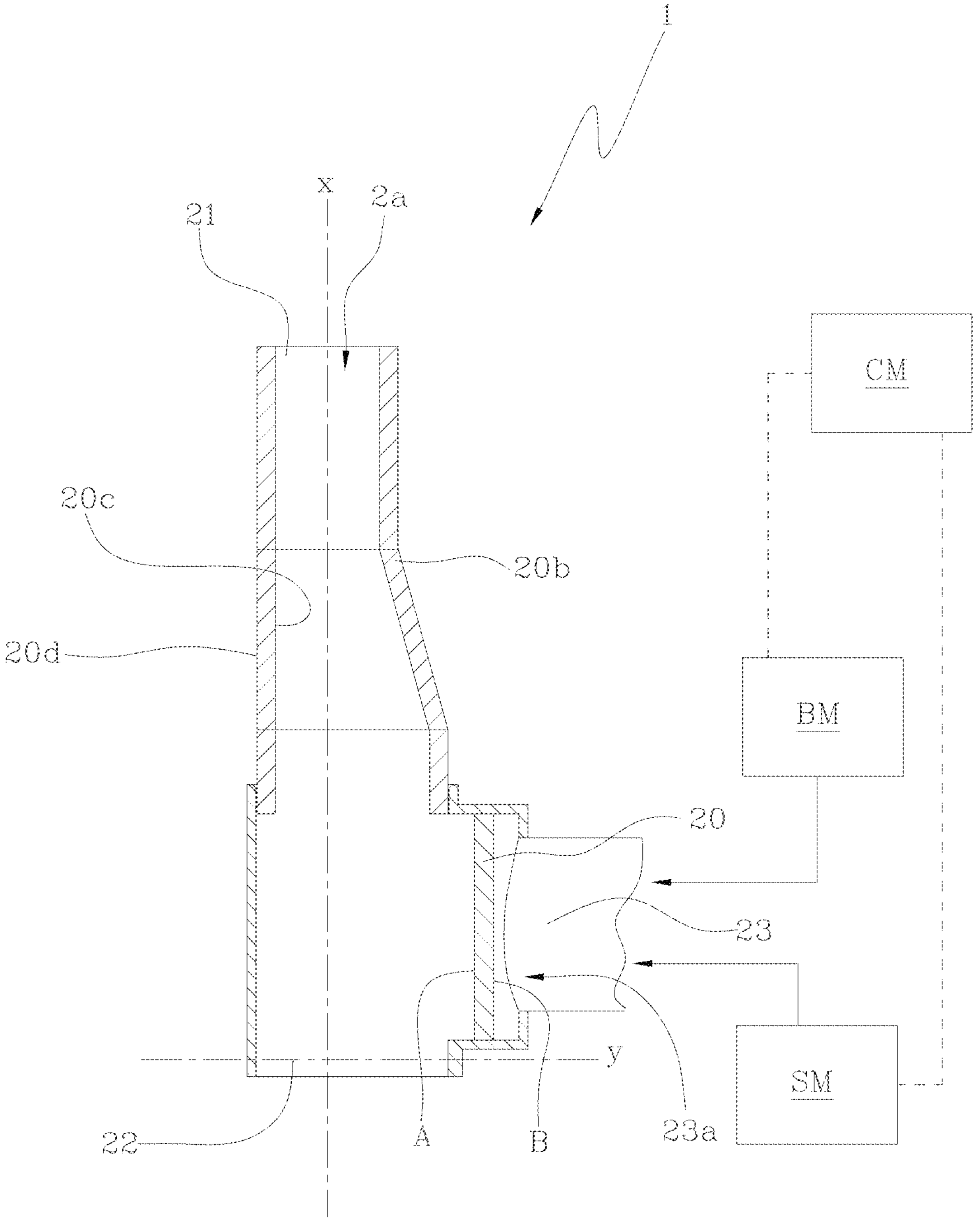
FIG. 4 shows a second embodiment of the dispensing device according to the present invention, seen on the same plane as FIG. 3.

In a possible embodiment, the filter (20) has a substantially flat conformation, e.g. a plate or disc shape, and is placed in front of the suction opening (23). The filter (20) comprises an inner surface (A) which delimits, inside it, at least one portion of the dispensing channel (2*a*), and an outer surface (B), opposing the inner surface (A) and facing the outside with respect to the dispensing channel (2*a*). The outer surface (B) and the inner surface (A) substantially define the two surfaces inside which the mass of the filter (20) is contained. Such embodiment is illustrated in FIG. 4.

Figure 3:
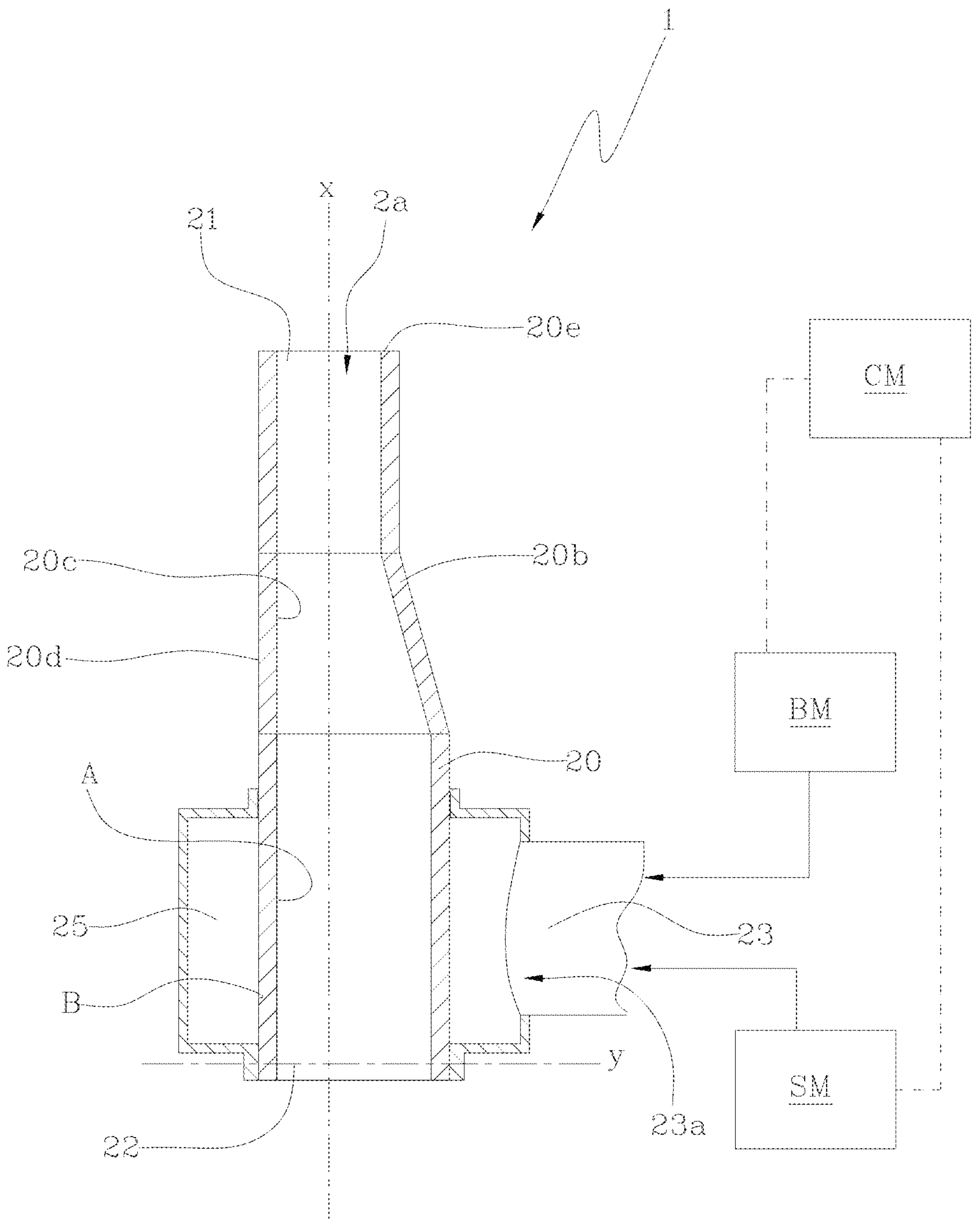
FIG. 3 shows a dispensing device according to the present invention, seen in a section view on a plane containing a longitudinal axis (X)

In a preferred embodiment, illustrated in FIG. 3, the filter (20) has a tubular conformation. The filter (20) comprises an inner surface (A) which delimits, inside it, at least one portion of the dispensing channel (2*a*), and an outer surface (B), opposing the inner surface (A) and facing the outside with respect to the dispensing channel (2*a*). In other words, given the tubular conformation of the filter (20), the outer surface (B) and the inner surface (A) substantially define the two surfaces inside which the mass of the filter (20) is contained. The filter (20) also has two head walls, placed at the ends of the filter (20) and lying on planes substantially perpendicular to the longitudinal axis (X).

Figure 2:
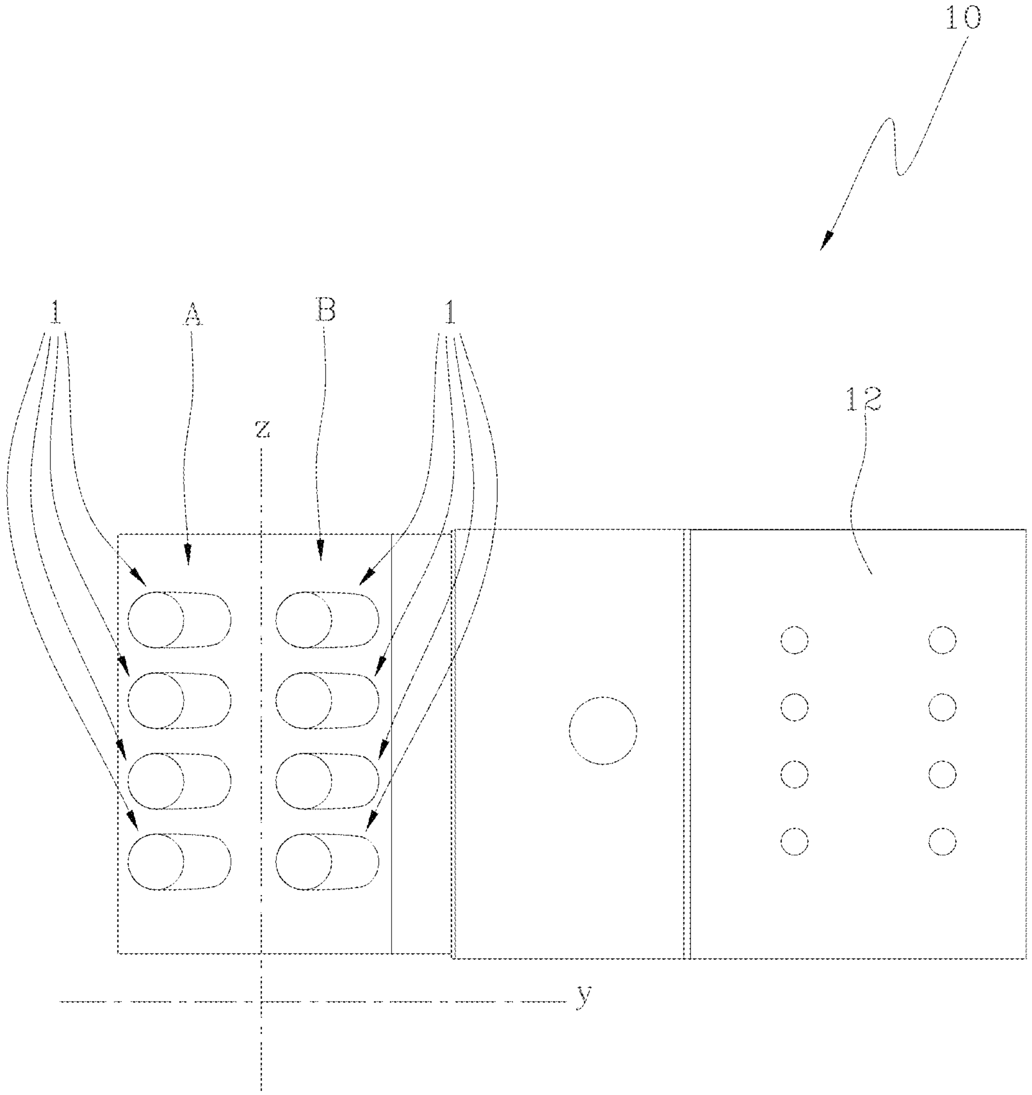
FIG. 2 shows a view from above of the dispensing bar of FIG. 1.

In the embodiment represented in FIG. 3, the outer surface (B) and the inner surface (A) have a cylindrical conformation, concentric to the longitudinal axis (X). Preferably, the outer surface (B) and the inner surface (A) are parallel to each other. In the area of the outlet section (22*a*), the outer surface (B) and the inner surface (A) have a cylindrical conformation with an oval shaped and flattened section on a plane containing the longitudinal axis (X) and the transverse axis (Y), as can be seen in the view from above in FIG. 2.

In the preferred but not exclusive embodiment shown in FIG. 3, the filter (20) has a tubular conformation, and is inserted in the main body (200). The filter (20) internally delimits a section of the dispensing channel (2*a*). The filter (20) is overlapping the suction opening (23). Further suction openings (23) can possibly be positioned on the section of the dispensing channel (2*a*) occupied by the filter (20).

During the operation of the dispensing device, the product supplied to the inlet opening (21) flows along the dispensing channel (2*a*). In the presence of an activation command of the suction means, the material adheres and is retained in contact with the inner surface (A) of the filter (20), substantially in the area of the suction opening (23) and of the further suction openings (23) if present. As already underlined, the retained product forms an accumulation which obstructs the dispensing channel (2*a*) and blocks the dispensing through the outlet opening (22).

A control module, not shown, is arranged to control, i.e. to activate/deactivate the suction means, or more precisely to place each suction opening (23) in communication with the suction means. Through an appropriate algorithm, the control module controls the dispensing of the product, placing the suction opening or openings (23) in communication with the suction means, e.g. by a distributor of the known type, not shown. By realising controlled dispensing/non-dispensing cycles for each dispensing device (1), and by realising a relative displacement between the dispensing bar (10) and the underlying support, it is possible to dispense the product on the underlying support.

A predetermined number of dispensing devices according to the present invention can be arranged along an alignment direction (Z), arranged side by side, to obtain a dispensing bar (10) of predetermined length. In the embodiment shown, the dispensing devices (1) are arranged along two rows (A,B) parallel to one another and parallel to the alignment direction (Z). The dispensing devices (1) of a first row (A) are offset with the dispensing devices (1) of the second row (B) with respect to a perpendicular and coplanar direction to the alignment direction (Z), in particular with respect to a parallel direction to the transverse direction (Y).

The outlet openings (22) are side by side and are facing in a same direction. For example, the outlet openings (22) are facing downwards. By obtaining an outlet opening (22) in a flattened form, as shown in the figures, it is possible to arrange the dispensing devices relatively close together, bringing the outlet openings (22) closer to each other. Preferably, the outlet openings (22) are arranged on a same dispensing plane, preferably horizontal. The dispensing bar allows a dispensing front of predetermined length to be defined along the alignment direction (Z) of the dispensing devices (1). Dispensing front substantially means an area that can be covered in a substantially uniform way by the product dispensed through the outlet openings (22). In particular, the dispensing devices (1) are flanked to one another so that the product dispensed through the outlet openings (22) can fully cover the dispensing front.

The dispensing device according to the present invention can be used to deposit the product, in a controlled manner, on an underlying plane or support. Both the dispensing device and the deposit plane of the product can be movable through suitable motors. For example, the dispensing device and the dispensing bar can be used to deposit the product on a movable conveyor plane, in predetermined positions and amounts. The movable plane can be driven in motion along a conveying direction, while the dispensing device and/or the dispensing bar can be translated along a direction horizontal and perpendicular to the conveying direction of the movable plane, and possibly also along a direction parallel to the conveying direction of the movable plane. The dispensing bar, arranged with the alignment direction (Z) of the dispensing devices transverse, in particular perpendicular, to the transport direction of the movable plane, substantially allows the product to be deposited over the entire width of the movable plane, understood as an extension measured perpendicular to the conveying direction, without the need to translate the dispensing bar transversely to the conveying direction.

To define the dispensing bar (10), two or more dispensing devices (1) can be arranged side by side. Two or more dispensing devices (1) can be joined together at predetermined zones of the respective bodies (200), so that the bodies (200) substantially form a single body (200). The suction means, not shown in detail, are connected to the suction openings (23) of the various dispensing devices (1) present through respective suction conduits (231), arranged through the single body (200). In a known way in the sector, the suction conduits (231) are placed selectively in communication with the suction means through respective distributors (12), activated in a programmed way by a control module.

Two or more dispensing bars (10) may be coordinated with one another in a dispensing head, for laying the product onto a wider surface and/or for realising predefined chromatic effects. Each dispensing bar (10) and/or each dispensing device (1) may be supplied with a product having different characteristics or colours. The independent control of each dispensing device (1) enables the product to be dispensed so as to reproduce predetermined patterns or decorations.

The control module, not shown, is arranged to control, i.e. to activate/deactivate the suction means, or more precisely to place each suction opening (23) in communication with the suction means. Through a relevant algorithm, the control module controls the dispensing of the product from each dispensing device (1), placing the relative suction opening or openings (23) in communication with suction means, through the distributors (12). By realising controlled dispensing/non-dispensing cycles for each dispensing device (1), and by realising a relative displacement between the dispensing bar (10) and the underlying support, it is possible to dispense the product on the underlying support, reproducing predetermined patterns and/or decorations, similar to those performed by an ink jet printer. In the case of the present invention, each dispensing device (1) performs a similar function to that of a nozzle of an ink jet printer.

Advantageously, the dispensing device (1) comprises at least one ventilation portion (20*b*), associated with the main body (200). The ventilation portion (20*b*) comprises an outer surface (20*d*) which is in communication with an environment at a certain pressure. Preferably, the outer surface (20*d*) of the ventilation portion (20*b*) is in communication with an environment at atmospheric pressure.

In a preferred embodiment, the ventilation portion (20*b*) is connected to the inlet opening (21). Preferably, the ventilation portion (20*b*) delimits the inlet opening (21).

Preferably, the ventilation portion (20*b*) has a tubular conformation. The ventilation portion (20*b*) comprises an inner surface (20*c*) which delimits, inside it, a conduit through which the product to be dispensed flows. Such conduit substantially defines a portion of the dispensing channel (2*a*). The ventilation portion (20*b*) further comprises an outer surface (20*d*), opposing the inner surface (20*c*) and facing towards the outside with respect to the dispensing channel (2*a*). The ventilation portion (20*b*) also has two head walls, placed at the ends thereof and lying on planes substantially perpendicular to the longitudinal axis (X). A head wall (20*e*) surrounds the inlet opening (21).

In other words, the ventilation portion (20*b*), at an end thereof, delimits the inlet opening (21). Both the ventilation portion (20*b*) and the inlet opening (21) are arranged outside the main body (200). The inlet opening (21) is therefore located at a predefined distance from the suction opening (23), depending on the length of the ventilation portion (20*b*) measured along the longitudinal axis (X). Furthermore, the outer surface (20*d*) of the ventilation portion (20*b*) is not located inside the main body (200), rather it is arranged outside the latter and communicates with the environment at a certain pressure, preferably at atmospheric pressure.

The presence of the ventilation portion (20*b*) offers the following important advantage. The depression that is created at the suction opening (23), or at the suction openings (23) if there are more than one, is not propagated along the entire dispensing channel (2*a*) but remains substantially confined to an area proximal to the suction opening or openings (23). In fact, in the area comprised in the ventilation portion (20*b*), the pressure is equalised between the dispensing channel (2*a*) and the external environment, through the ventilation portion (20*b*) itself. In other words, given the porosity or permeability to air of the ventilation portion (20*b*), the dispensing channel (2*a*) and the external environment are substantially in communication with one another in the area of the ventilation portion (20*b*). This implies that the product, in the portion of the dispensing channel (2*a*) arranged within the ventilation portion (20*b*), does not suffer substantially from the depression produced in the area proximal to the suction opening or openings (23), i.e. the depression does not propagate through the product and, therefore, does not interfere with the adjacent dispensing devices in a dispensing bar. The effect produced by the ventilation portion (20*b*), which enables the pressure to be equalised between the dispensing channel (2*a*) and the external environment in the ventilation portion (20*b*), is particularly advantageous in a dispensing bar, of the type shown in FIGS. 1 and 2, wherein two or more dispensing devices (1) are supplied by a single tank of product. In the absence of the ventilation portion (20*b*), the depression produced by each suction opening (23) would propagate to the tank, disturbing the power supply of the other dispensing devices.

Preferably, but not necessarily, the ventilation portion (20*b*) is made in the form of a filter, i.e. it is provided with a perforated wall, which enables the passage of air but retains the product particles or granules, like the filter (20).

In the embodiment illustrated in FIG. 3, in which the filter (20) has a tubular conformation, the ventilation portion (20*b*) is arranged concentric to the filter (20) itself. Preferably, but not necessarily, the filter (20) and the ventilation portion (20*b*) are a single body. In other words, in the embodiment of FIG. 3, the ventilation portion (20*b*) is a portion of the filter (20) itself. It would also be possible to realise the filter (20) in tubular form and the ventilation portion (20*b*) as two separate bodies.

In the embodiment of FIG. 4, the ventilation portion (20*b*) is separate from the filter (20) placed in front of the suction opening (23).

In the embodiment shown in FIG. 3, the dispensing device comprises an annular chamber (25) concentric with the filter (20) and placed in communication with the suction means. As shown in FIG. 3, the annular chamber (25) is defined on a wall of the dispensing channel (2*a*), in the form of a recess in the wall itself. The filter (20) is inserted in the dispensing conduit (2*a*) overlapping the annular chamber (25) and separating the chamber (25) itself from the dispensing channel (2*a*) available for the flow of the product. The suction openings (23) present are positioned on a wall of the annular chamber (25), as shown in FIG. 3. The presence of the annular chamber (25) allows the suction effect or the negative pressure produced by the suction means to be distributed around the entire filter (20). In this way, the product is attracted and retained on a circular crown, i.e. on a ring-like surface of the filter (20), forming an equally annular accumulation that is able to very quickly block the dispensing channel (2*a*).

To facilitate the restoration of the dispensing of the product after a step of closure, i.e. after a step of activation of the suction means, the dispensing device is provided with blowing means, placed in communication with the dispensing channel (2*a*) and arranged to produce a pressure that, in terms of absolute value, is greater than or equal to the negative pressure produced by the suction means in the dispensing channel (2*a*).

In a possible embodiment, one or more blowing openings, not illustrated, are placed in communication with the dispensing channel (2*a*). In the solution shown, which provides the filter (20), the blowing openings are facing the filter (20) itself, to direct the flow of air through the latter and to promote the detachment of the product. For example, one or more blowing openings may be positioned on the wall of the annular chamber (25).

In a preferred embodiment, the blowing means is connected to the dispensing channel (2*a*) through the suction openings (23). In substance, the flow of air produced by the blowing means is introduced into the dispensing channel (2*a*) through the suction opening or openings (23), connected in advance to the blowing means through the distributors (12). In substance, each distributor (12) is structured to connect the blowing means or suction means to the suction openings (23), under the control of the control module.

The control of the dispensing device substantially occurs through the control of the suction means and/or the blowing means, if present.

In the embodiment comprising only the suction means, the activation of the latter retains at least a part of the product in contact with a wall of the dispensing channel (2*a*) causing the obstruction thereof. The deactivation of the suction means frees the product which resumes flowing along the dispensing channel (2*a*).

In the case in which the blowing means is also included, the control of the dispensing of the product can occur in different modes. In a first mode, the dispensing of the material is commanded by deactivating the suction means and, simultaneously or subsequently, activating the blowing means. In a second mode, the suction means can be maintained always active and, to allow the dispensing of the product, the blowing means is activated, whose effect contrasts and cancels the retaining effect produced by the suction means. In the solution in which the pressure or flow rate produced by the blowing means is substantially equal, in absolute value, to the negative pressure or flow rate produced by the suction means, the activation of the blowing means cancels the negative pressure produced by the suction means, causing the release of the product.

In the solution in which the pressure or flow rate produced by the blowing means is greater, in absolute value, than the negative pressure or flow rate produced by the suction means, the activation of the blowing means produces the introduction of an airflow into the dispensing channel (2*a*).

The introduction of an airflow fluidises the product, causing a rapid detachment from the wall of the dispensing channel (2*a*) and/or from the filter (20). The activation/deactivation of the suction means and/or of the blowing means according to a predetermined time cycle allows the amount of dispensed product to be varied in a very precise manner. For example, it is possible to dispense the product in small subsequent amounts, defined through corresponding activation/deactivation cycles of the suction means and/or the blowing means.

The invention claimed is:

1. A dispensing bar for granular or powdered materials, comprising two or more dispensing devices (1), each dispensing device (1) comprising:

a main body (200);

a dispensing channel (2*a*), arranged at least partially in the main body (200) and provided with a longitudinal axis (X), an inlet opening (21) and an outlet opening (22);

a suction means, provided to retain, upon command, at least a part of granular or powdered material inside the dispensing channel (2*a*), so as to form an accumulation that obstructs the dispensing channel (2*a*) and prevents the flow of material;

at least one suction opening (23), placed in communication with the dispensing channel (2*a*) and with the suction means;

a filter (20), interposed between the suction opening (23) and the dispensing channel (2*a*);

wherein each dispensing device comprises at least one ventilation portion (20*b*), associated with the main body (200) and connected to the inlet opening (21), which is provided with an outer surface (20*d*) placed in communication with an environment at a determined pressure;

wherein the dispensing devices (1) are flanked to one another along an alignment direction (Z) and joined together at predetermined zones of the respective bodies (200), so that the bodies (200) substantially form a single body (200); and wherein the suction means is connected to the suction openings (23) through suction conduits (231), arranged through the single body (200).

2. The dispensing bar according to claim 1, wherein the outer surface (20*d*) of the ventilation portion (20*b*) is in communication with an environment at atmospheric pressure.

3. The dispensing bar according claim 1, wherein the ventilation portion (20*b*) has a tubular conformation and comprises an inner surface (20*c*) that delimits, inside it, a conduit that substantially defines a portion of the dispensing channel (2*a*), and the outer surface (20*d*), opposing the inner surface (20*c*) and turned towards the outside with respect to the dispensing channel (2*a*).

4. The dispensing bar according to claim 1, wherein the ventilation portion (20*b*) defines, at an own end thereof, the inlet opening (21).

5. The dispensing bar according to claim 1, comprising an annular chamber (25) concentric with the filter (20) and placed in communication with the suction means.

6. The dispensing bar according to claim 1, comprising blowing means, placed in communication with the dispensing channel (2*a*) and arranged to produce a pressure or flow rate that, in terms of absolute value, is greater than or equal to the negative pressure or flow rate generated by the suction means in the dispensing channel (2*a*).

7. The dispensing bar according to claim 6, comprising one or more blowing openings that are placed in communication with the dispensing channel (2*a*).

8. The dispensing bar according to claim 6, wherein the blowing means is placed in communication with the dispensing channel (2*a*) through the suction opening or openings (23).

9. The dispensing bar according to claim 6, comprising a distributor (12) provided to selectively connect the suction opening or openings (23) with the suction means or with the blowing means.

10. The dispensing bar according to claim 1, comprising a control module, provided to control the suction means.

11. The dispensing bar according to claim 1, wherein the suction wherein the suction conduits (231) are placed selectively in communication with the suction means through respective distributors (12).

12. The dispensing bar according to claim 1, wherein:

the dispensing devices (1) are arranged along at least two rows (A,B) parallel to one another and parallel to the alignment direction (Z);

the dispensing devices (1) of a first row (A) are offset with the dispensing devices (1) of the second row (B) with respect to a perpendicular and coplanar direction to the alignment direction (Z).

13. The dispensing bar according to claim 1, wherein the two or more dispensing devices (1) are flanked to one another such that the granular or powdered material dispensed through the outlet openings (22) can fully cover a dispensing front.

14. A dispensing head, comprising two or more dispensing bars (10) according to claim 1.

15. The dispensing head according to claim 14, wherein the two or more dispensing bars (10) are coordinated with each other for laying the product onto a wider surface or for realizing predefined chromatic effects.

16. The dispensing head according to claim 14, wherein at least of two of the dispensing bars (10) are supplied with different granular or powdered materials having different characteristics or colors.

17. The dispensing bar according to claim 1, wherein at least of two of the dispensing devices (1) are supplied with different granular or powdered materials having different characteristics or colors.

18. The dispensing bar according to claim 1, wherein each dispensing device (1) is controlled independently, such that predetermined patterns or decorations can be produced.

* * * * *